United States Patent [19]
Abele et al.

[11] Patent Number: 5,134,519
[45] Date of Patent: Jul. 28, 1992

[54] PERISCOPE SWITCHOVER MIRROR SYSTEM

[75] Inventors: Alfons Abele, Schwäbisch Gmünd; Klaus Völker, Aalen, both of Fed. Rep. of Germany

[73] Assignee: Carl-Zeiss-Stiftung, Heidenheim, Fed. Rep. of Germany

[21] Appl. No.: 610,065

[22] Filed: Nov. 7, 1990

Related U.S. Application Data

[63] Continuation of Ser. No. 398,645, Aug. 25, 1989, abandoned.

[30] Foreign Application Priority Data

Sep. 1, 1988 [DE] Fed. Rep. of Germany ....... 3829708

[51] Int. Cl.$^5$ .......................... G02B 23/08; G02B 5/04
[52] U.S. Cl. .................... 359/405; 359/402; 359/835
[58] Field of Search ................... 350/501–504, 350/540–573, 286, 287, 484–487, 618–622; 359/399–406, 431, 503, 506, 831, 833–837

[56] References Cited

U.S. PATENT DOCUMENTS

| | | | |
|---|---|---|---|
| 1,635,011 | 7/1927 | Sadler | 350/622 |
| 2,167,657 | 8/1939 | Karnes | 350/622 |
| 3,409,371 | 11/1968 | Strang | 350/541 |
| 4,123,151 | 10/1978 | Aurin | 350/618 |
| 4,206,991 | 6/1980 | Kobori et al. | 350/618 |
| 4,704,000 | 11/1987 | Pekar et al. | 350/540 |
| 4,801,197 | 1/1989 | Minami | 350/622 |

FOREIGN PATENT DOCUMENTS

| | | |
|---|---|---|
| 2623955 | 7/1977 | Fed. Rep. of Germany . |
| 0672579 | 5/1952 | United Kingdom . |
| 1534545 | 12/1978 | United Kingdom . |

*Primary Examiner*—Rodney B. Bovernick
*Assistant Examiner*—Thong Nguyen
*Attorney, Agent, or Firm*—Walter Ottesen

[57] ABSTRACT

A switchover mirror system for a periscope has an even number of reflection surfaces for enabling an observer to view a first scene in a first sight direction forward of the observer and an uneven number of reflection surfaces for enabling the observer to view a second scene in a second sight direction rearward of the observer. One of the reflection surfaces is disposed on a member which is pivoted about a pivot axis arranged eccentrically with respect to the member. With a simple construction and a reduced number of movable elements, the image during switchover of the sight direction remains upright and similar fields of view are obtained at the same periscopic elevation as for mirrors which are not switched over.

33 Claims, 4 Drawing Sheets

PERISCOPE SWITCHOVER MIRROR SYSTEM

RELATED APPLICATION

This is a continuation-in-part of the U.S. Pat. application Ser. No. 398,645 filed Aug. 25, 1989 and entitled "Periscope Switchover Mirror System", now abandoned.

FIELD OF THE INVENTION

The invention relates to a periscope switchover mirror system for enabling a viewer to view a first scene in a first sight direction forward of the viewer and a second scene in a second sight direction rearward of the viewer. The mirror system includes an even number of reflective surfaces for the forward viewing direction and an uneven number of reflective surfaces for the rearward viewing direction. One of the reflective surfaces is arranged for pivoting about a pivot point arranged eccentrically with respect to the reflective surfaces.

BACKGROUND OF THE INVENTION

Switchover mirror systems for periscopes are intended to permit viewing in two directions over viewing obstacles and preferably to the front and to the rear without it being necessary for the viewer to leave the viewing position when changing the sight direction.

Periscopic mirror systems with a switchover sight direction are disclosed, for example, in U.S. Pat. No. 4,123,151 incorporated herein by reference. With this known periscope, the incident beam is deflected via at least one mirror surface on the inner wall of the periscope shaft for one of the sight directions. The disadvantage of this known mirror system is that image cropping and sight field cropping must be accepted for oblique views or disturbing double images occur.

SUMMARY OF THE INVENTION

It is an object of the invention to provide a periscope switchover mirror system wherein the switchover of the sight directions from front to rear is achieved with simple means. It is another object of the invention to provide such a system wherein the image occurring with a switchover of the sight direction remains upright. It is still a further object of the invention to provide such a periscope switchover mirror system which enables the viewer to retain the head and body position initially adopted for both sight directions.

The periscope switchover mirror system of the invention is for enabling an observer to view a first scene in a first sight direction forward of the observer with a first incoming light beam travelling in said first sight direction and to view a second scene in a second sight direction rearward of the observer with a second incoming light beam travelling in said second sight direction. According to one embodiment of the invention, the periscope switchover mirror system includes: a housing; a plurality of optical members pivotally mounted in said housing so as to be in spaced relationship to each other; a plurality of reflective surfaces disposed on said members; means for pivotally moving said optical members out of a first position arrangement wherein an even number of said reflective surfaces define a first viewing beam path to enable the observer to view said first scene and into a second position arrangement wherein an odd number of said reflective surfaces define a second viewing beam path to enable the observer to view said second scene; a first one of said members having a center and a second one of said members being a prism; first pivot means for pivotally mounting said first member in said housing so as to pivot about a central pivot axis passing through said center; a first one of said reflective surfaces being disposed on said first member as a first entrance mirror surface and said first member being pivotally disposed in said first position arrangement so as to cause said entrance mirror surface to be at 45° to said first sight direction for deflecting said first incoming light beam entering therealong; a second one of said reflective surfaces being disposed on a first surface of said prism as a first exit mirror surface and said second member being pivotally disposed in said first position arrangement so as to enable said first exit mirror surface to receive the light beam reflected from said entrance mirror surface and to deflect this light beam toward the observer; second pivot means for pivotally mounting said second member in said housing so as to permit said prism to pivot about a prism pivot axis located eccentrically of said second reflective surface; a third one of said reflective surfaces being disposed on a second surface of said prism and a fourth one of said reflective surfaces being disposed on a third surface of said prism as an exit reflective surface; said first member being rotated through 90° about said central pivot axis to bring said first member into said second position arrangement so as to cause said entrance mirror surface to receive the second incoming light beam from said second scene and deflect this light toward said second member; and, said second member being rotated through 112.5° about said prism pivot axis to bring said second member into said second position arrangement so as to cause the third reflective surface and said exit mirror surface to become optically effective to deflect the light of said second incoming light beam toward the observer.

According to other features of the invention, the mirror system is accommodated in a shaft and the mirrors are movable by mechanical means.

The distance to a viewed object can be made to appear shortened and the field of view can be enlarged if the portion of the shaft interior disposed between the entrance mirror and the exit mirror of the mirror system is made of a medium which has an optical density greater than the remaining portion of the shaft.

With a suitable point of the entrance reflection surface, the entrance beam with the sight direction forward can be shifted in elevation with respect to the entrance beam with the sight direction rearward.

The advantages of the invention are especially seen in the simplicity of the construction and in the low number of elements which are to be moved as well as in the fact that similar fields of view are obtained for the same periscope elevation as in the case of mirror systems which cannot be switched over.

BRIEF DESCRIPTION OF THE DRAWINGS

The invention will now be described with reference to the drawings wherein:

FIG. 3b is a section view taken along line IIIb-IIIb of FIG. 3a;

FIG. 6b is a section view taken along line VIb—VIb of FIG. 6a;

DESCRIPTION OF THE PREFERRED EMBODIMENTS OF THE INVENTION

Figure 1A:
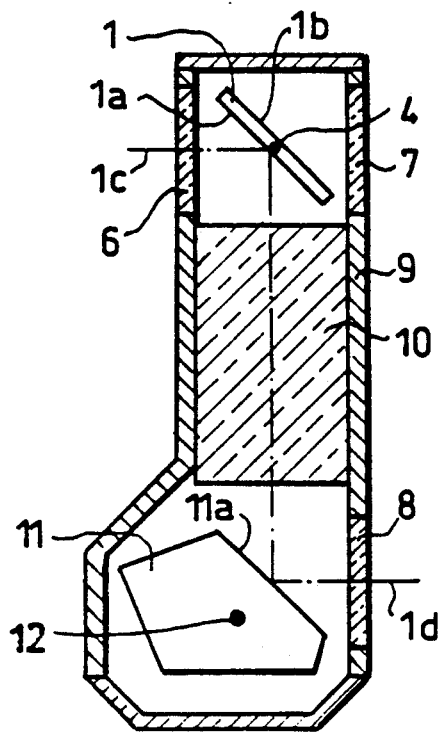
FIG. 1a is a schematic of a first embodiment of the mirror system according to the invention arranged in a periscope shaft with the reflective surfaces shown in their respective positions for the sight direction forward.
Figure 1B:
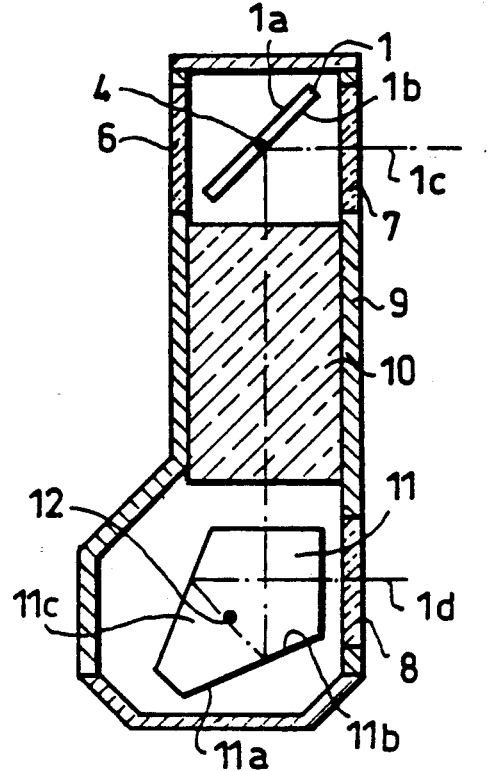
FIG. 1b is a schematic of the embodiment of FIG. 1a with the reflective surfaces positioned for the sight direction rearward.

In the embodiment of FIGS. 1a and 1b, the entrance mirror is identified by reference numeral 1 and its entrance reflective surfaces for the sight directions forward and rearward are identified by reference numerals 1a and 1b, respectively. The incoming light beam is identified by reference numeral 1c and the outgoing light beam by reference numeral 1d. The entrance mirror 1 can, for example, be a plane-parallel plate with the reflective surfaces 1a and 1b being formed thereon.

The prism 11 has an outer surface on which it carries the reflective surface 11a and two inner sides on which the prism carries the reflective surfaces 11b and 11c, respectively.

In FIG. 1a, the incoming light beam 1c is deflected by reflective surface 1a through an angle of 90° and is directed perpendicularly downward onto the reflective surface 11a of prism 11, which, in turn, directs the beam horizontally outward toward the viewer as exit beam 1d. The viewing direction is switched over in the position of the sight axis to the rearward direction by pivoting the entrance mirror 1 through 90° about the center pivot point 4 and the prism 11 through 112.5° about the pivot point 12 as shown in FIG. 1b. In this case, the incoming light beam which incidents horizontally, is directed perpendicularly downward by the mirror surface 1b and is directed toward the viewer as an exit beam 1d after being deflected by the reflective surfaces 11b and 11c of prism 11. As shown in FIGS. 1a and 1b, the reflective surfaces 11b and 11c are at 45° with respect to each other.

The entrance mirror 1 and the prism 11 are arranged in a periscope shaft 9 which has a forward entrance window 6, a rearward entrance window 7 and an exit window 8. A medium 10 is introduced into the mid-region of the shaft 9. The medium 10 is optically denser than the air in the remaining regions of the shaft and functions to increase the field of view.

Figure 2A:
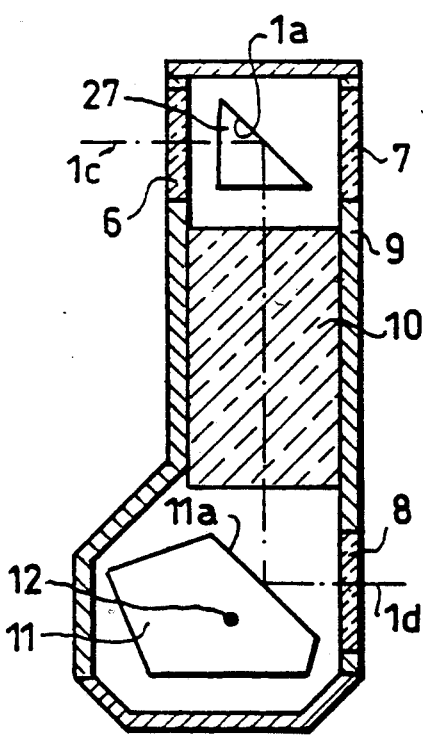
FIG. 2a is a schematic of a second embodiment of the mirror system of the invention arranged in a periscope shaft with the reflective surfaces shown for the sight direction forward.
Figure 2B:
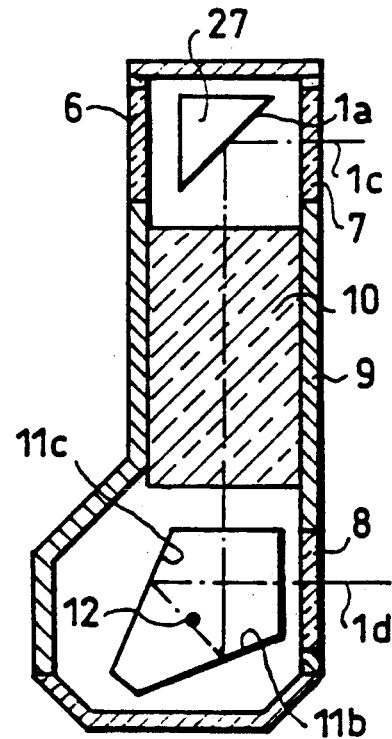
FIG. 2b is a schematic of the embodiment shown in FIG. 2a with the reflective surfaces positioned for the sight direction rearward.

An embodiment is shown in FIGS. 2a and 2b wherein the entrance reflective surface 1a is applied to the inner hypotenuse side of prismatic body 27. The remaining reference numerals correspond to those shown in the embodiment of FIGS. 1a and 1b.

Figure 3A:
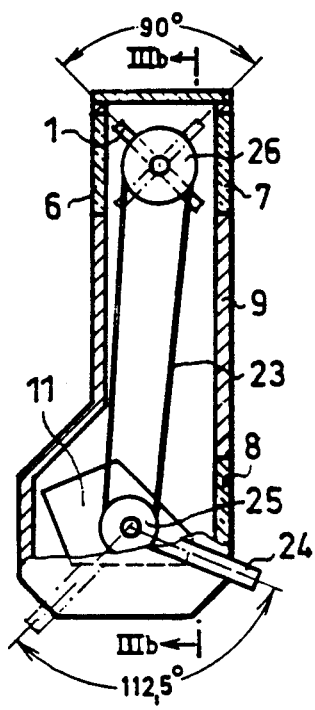
FIG. 3a is an elevation view taken along line IIIa-IIIa of FIG. 3b and shows a mechanical positioning system for the mirror system of FIGS. 1a and 1b.
Figure 3B:
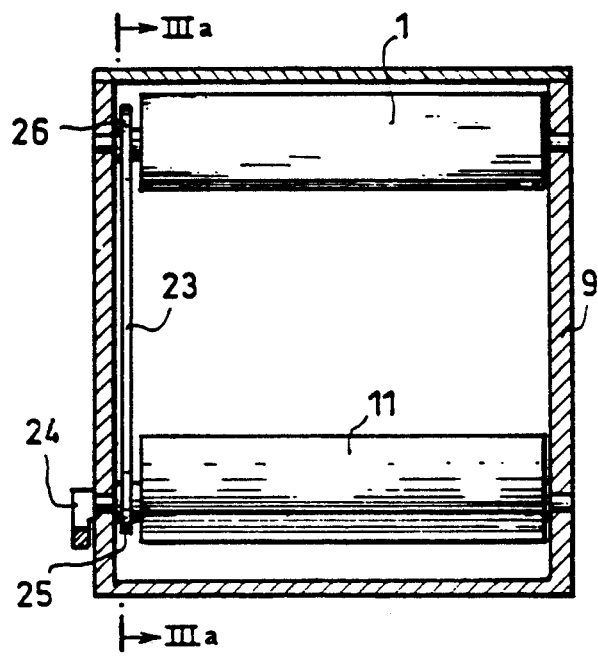

For the embodiment shown in FIGS. 1a and 1b, the mirror 1 and the prism 11 can be rotated individually, for example manually, or they can be rotated in common with the aid of a mechanical coupling such as the belt drive 23 shown in FIGS. 3a and 3b with the belt drive being driven by actuating the lever 24. By actuating the lever 24, the mirror 1 is pivoted through 90° and the prism 11 through 112.5° in correspondence to the diameter ratio of the two discs 25 and 26.

In the schematics of FIGS. (4a, 4b, 4c) and FIGS. (5a, 5b), the two entrance mirrors are identified by reference numerals 15 and 16, respectively, and the exit mirror is identified by reference numeral 17. The reflective surfaces corresponding to the mirrors are identified by reference numerals 15a, 16a, 16b and 17a.

Figure 4A:
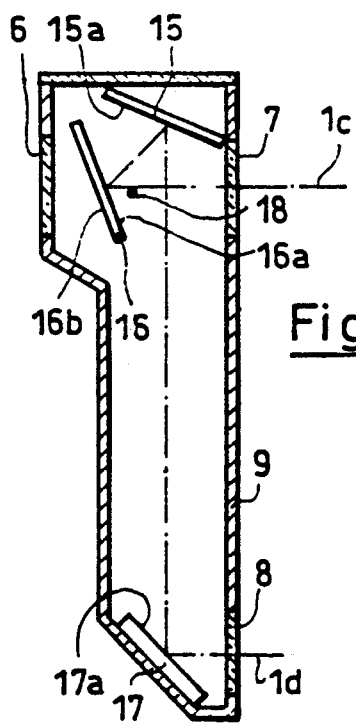
FIG. 4a is a schematic of a third embodiment of the mirror system of the invention with the reflective surfaces shown in their respective positions for the sight direction rearward.
Figure 4B:
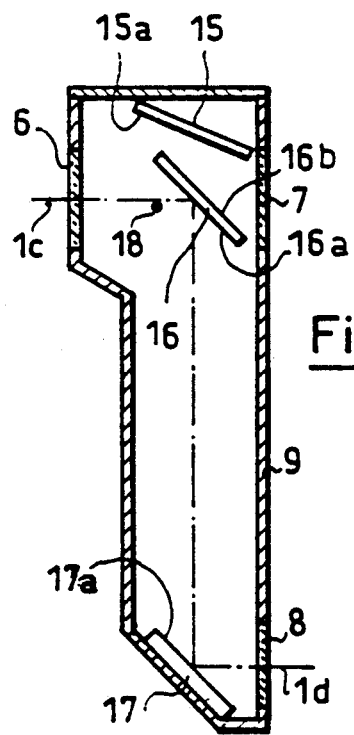
FIG. 4b is a schematic of the embodiment of FIG. 4a with the reflective surfaces shown in their respective positions for the sight direction forward.

The schematic of FIG. 4a shows an embodiment wherein the position of the sight axis for the viewing direction is toward the rear. In this case, the optical axis of the viewing beam is deflected by two reflective surfaces (16a and 15a) out of the horizontal incident line and perpendicularly downward where the viewing beam is deflected by a third reflective surface 17a into the horizontal and toward the viewer. The two reflective surfaces (16a and 15a) are arranged at 45° to each other and the third reflective surface 17a is disposed on a mirror 17 fixedly mounted in the shaft 9.

Figure 4C:
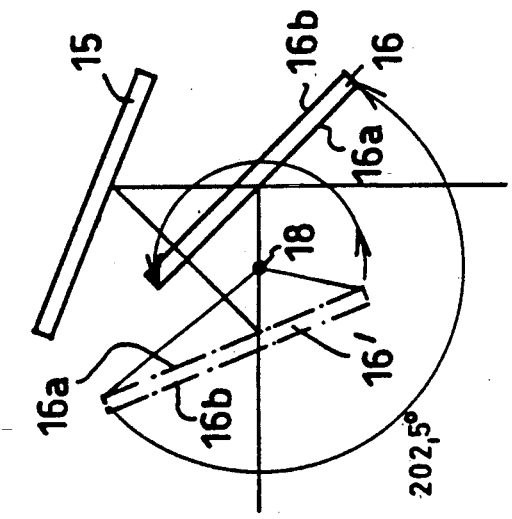
FIG. 4c is a schematic showing the entrance mirror of the embodiment of FIGS. 4a and 4b pivoted about an eccentrically disposed pivot point for changing the sight direction.

The sight axis is switched over in position for the forward viewing direction by pivoting the entrance mirror 16 through 202.5° about the pivot point 18 as shown in FIG. 4c. Accordingly, the optical axis of the viewing beam running horizontally is deflected by the reflective surface 16a perpendicularly downward and is again deflected into the horizontal by the parallelly arranged second reflective surface 17a.

Figure 5B:
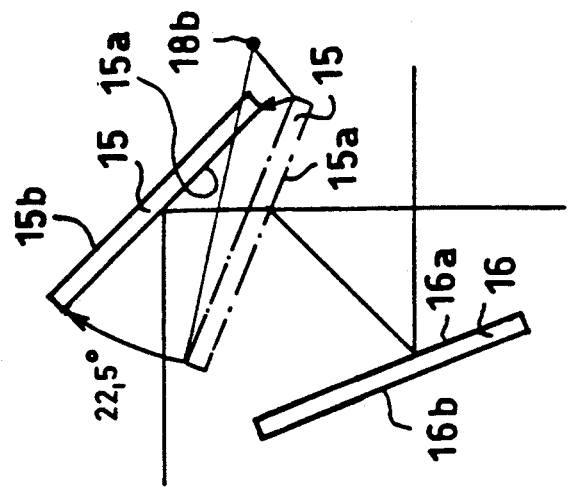
FIG. 5b is a schematic showing the pivoting action of the entrance mirror about a pivot point disposed at still another location.
Figure 5A:
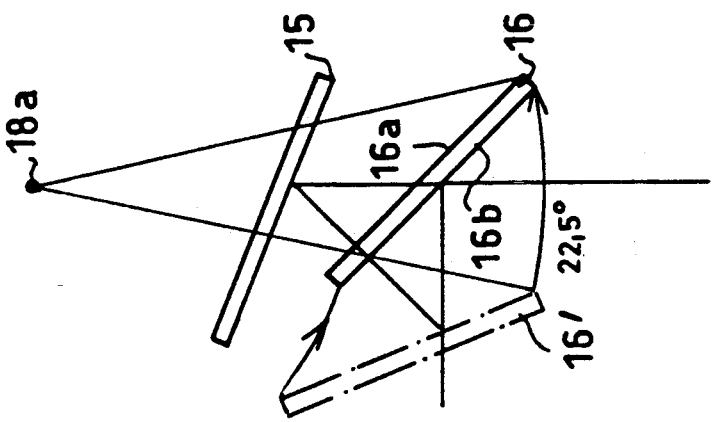
FIG. 5a is a schematic illustrating the pivoting action of the entrance mirror about a pivot point disposed at a location different from that shown in FIG. 4c.

In the schematics of FIGS. 5a and 5b, the entrance mirrors 16 and 15 are shown pivoting through 22.5° about other pivot points 18a and 18b, respectively. In FIG. 5a, the surface 16b acts for the forward viewing direction and the surface 16a for the rearward viewing direction. In FIG. 5b, the surface 15a acts for reflecting in the rearward viewing direction as well as in the forward viewing direction. The entry beam in the forward viewing direction is displaced in elevation with respect to the entry beam for the rearward viewing direction.

Figure 6A:
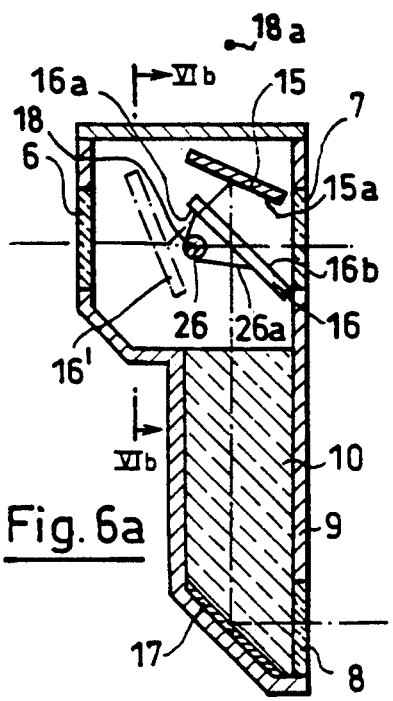
FIG. 6a is an elevation section view taken along line VIa-VIa of FIG. 6b and shows the mechanical positioning system for the mirror system of FIGS. 4a and 4b.
Figure 6B:
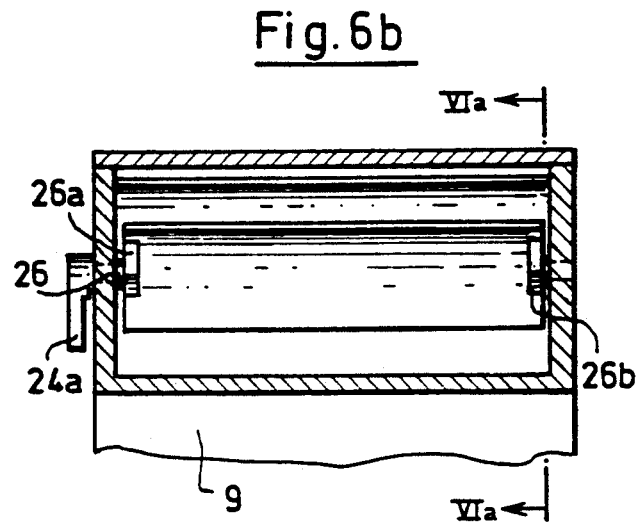

The embodiment of the mechanical positioning system shown in FIGS. 6a and 6b and the mechanical positioning system shown in FIGS. 7a and 7b again show the arrangement of respective mirror systems in periscope shafts. The two entrance mirrors are again identified by reference numeral 15 and 16 in the periscope shaft 9. The forward entrance window is again identified by reference numeral 6 and the rearward entrance window by reference numeral 7.

In the embodiment shown FIGS. 6a and 6b, the mirror system is arranged in a periscope shaft filled with a medium 10 having an optical density greater than air. The mirror 16 is pivoted by the actuating mechanism (26, 26a) through 202.5° about the pivot point 18 by actuating the lever 24a in order to switchover the viewing direction.

Figure 7A:
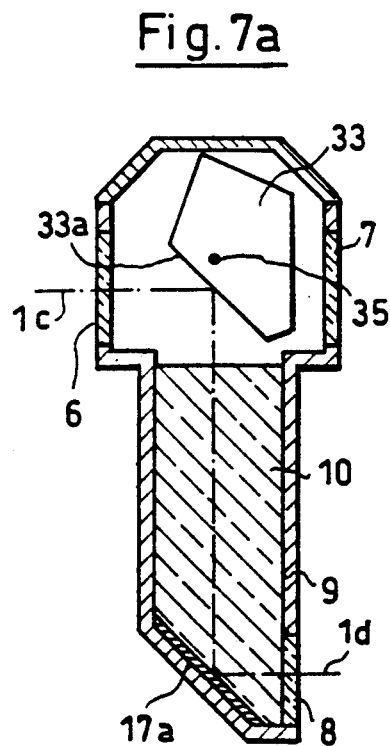
FIG. 7a is a schematic of a fourth embodiment of the mirror system of the invention with the reflective surfaces shown in their respective positions for the sight direction forward; and, FIG. 7b is a schematic of the embodiment of FIG. 7a for the sight direction rearward.
Figure 7B:
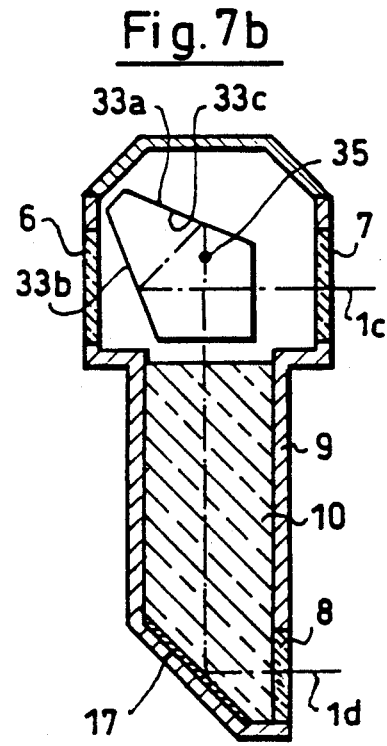

In the embodiment of FIGS. 7a and 7b, an entrance prism 33 is used in lieu of the two entrance mirrors. This arrangement affords the advantage of a larger field of view for the rearward viewing direction. The switchover in another viewing direction takes place by pivoting the entrance prism 33 through 202.5° about the pivot point 35. The prism can be pivoted manually, or the mechanism (26, 26a) shown in FIGS. 6a and 6b can be used to effect the pivoting movement. The two reflective surfaces 33b and 33c lie at an angle of 45° to each other.

It is understood that the foregoing description is that of the preferred embodiments of the invention and that various changes and modifications may be made thereto without departing from the spirit and scope of the invention as defined in the appended claims.

What is claimed is:

1. A periscope switchover mirror system for enabling an observer to view a first scene in a first sight direction forward of the observer with a first incoming light beam travelling in said first sight direction and to view a second scene in a second sight direction rearward of the observer with a second incoming light beam travelling in said second sight direction, the periscope switchover mirror system comprising:

a housing;

a plurality of optical members pivotally mounted in said housing so as to be in spaced relationship to each other;

a plurality of reflective surfaces disposed on said members;

means for pivotally moving said optical members out of a first position arrangement wherein an even number of said reflective surfaces define a first viewing beam path to enable the observer to view said first scene and into a second position arrangement wherein an odd number of said reflective surfaces define a second viewing beam path to enable the observer to view said second scene;

a first one of said members having a center and a second one of said members being a prism;

first pivot means for pivotally mounting said first member in said housing so as to pivot about a central pivot axis passing through said center;

a first one of said reflective surfaces being disposed on said first member as a first entrance mirror surface and said first member being pivotally disposed in said first position arrangement so as to cause said entrance mirror surface to be at 45° to said first sight direction for deflecting said first incoming light beam entering therealong;

a second one of said reflective surfaces being disposed on a first surface of said prism as a first exit mirror surface and said second member being pivotally disposed in said first position arrangement so as to enable said first exit mirror surface to receive the light beam reflected from said entrance mirror surface and to deflect this light beam toward the observer;

second pivot means for pivotally mounting said second member in said housing so as to permit said prism to pivot about a prism pivot axis located eccentrically of said second reflective surface;

a third one of said reflective surfaces being disposed on a second surface of said prism and a fourth one of said reflective surfaces being disposed on a third surface of said prism as an exit reflective surface;

said first member being rotated through 90° about said central pivot axis to bring said first member into said second position arrangement so as to cause said entrance mirror surface to receive the second incoming light beam from said second scene and deflect this light toward said second member; and, said second member being rotated through 112.5° about said prism pivot axis to bring said second member into said second position arrangement so as to cause the third reflective surface and said exit mirror surface to become optically effective to deflect the light of said second incoming light beam toward the observer.

2. The periscope switchover mirror system of claim 1, said first member being a plane-parallel plate and said entrance reflective surface being disposed on said plate.

3. The periscope switchover mirror system of claim 1, said first member being a prismatic body and said entrance reflective surface being disposed on said body.

4. The periscope switchover mirror system of claim 1, said means for pivotally moving said members between said position arrangements being mechanical means articulately interconnecting said members.

5. The periscope switchover mirror system of claim 1, said housing being a hollow shaft and said members being pivotally mounted in said shaft; and, said shaft including: a forward entrance window for receiving light from said first scene; a rearward entrance window for receiving light from said second scene; and, an exit window for passing said light to the observer.

6. The periscope switchover mirror system of claim 5, said first member being arranged at one end of said shaft adjacent said entrance windows and said second member being arranged at the other end of said shaft adjacent said exit window; said shaft having a mid region between said ends; and, said system further comprising a first medium disposed in said shaft at said mid region so as to be disposed between said first and second members; a second medium disposed in the remainder of said shaft; and, said first medium having an optical density greater than said second medium.

7. The periscope switchover mirror system of claim 6, said second medium being air.

8. A periscope switchover mirror system for enabling an observer to view a first scene in a first sight direction forward of the observer with a first incoming light beam travelling in said first sight direction and to view a second scene in a second sight direction rearward of the observer with a second incoming light beam travelling in said second sight direction, the periscope switchover mirror system comprising:

a housing;

a plurality of optical members pivotally mounted in said housing so as to be in spaced relationship to each other;

a plurality of reflective surfaces disposed on said members;

means for pivotally moving said optical members out of a first position arrangement wherein an even number of said reflective surfaces define a first viewing beam path to enable the observer to view said first scene and into a second position arrangement wherein an odd number of said reflective surfaces define a second viewing beam path to enable the observer to view said second scene;

a first one of said members being a mirror having a center and a second one of said members being a prism;

first pivot means for pivotally mounting said first member in said housing so as to pivot about a central pivot axis passing through said center;

a first one of said reflective surfaces being disposed on said first member as a first entrance mirror surface and said first member being pivotally disposed in said first position arrangement so as to cause said entrance mirror surface to be at 45° to said first sight direction for deflecting said first incoming light beam entering therealong;

a second one of said reflective surfaces being disposed on a first surface of said prism as a first exit mirror surface and said second member being pivotally disposed in said first position arrangement so as to enable said first exit mirror surface to receive the light beam reflected from said entrance mirror surface and to deflect this light beam toward the observer;

second pivot means for pivotally mounting said second member in said housing so as to permit said prism to pivot about a prism pivot axis located eccentrically of said second reflective surface;

a third one of said reflective surfaces being disposed on said first member as a second entrance mirror surface;

a fourth one of said reflective surfaces being disposed on a second surface of said prism and a fifth one of said reflective surfaces being disposed on a third surface of said prism as a second exit reflective surface;

said first member being rotated through 90° about said central pivot axis to bring said first member into said second position arrangement so as to cause said second entrance mirror surface to receive the second incoming light beam from said second scene and deflect this light toward said second member; and, said second member being rotated through 112.5° about said prism pivot axis to bring said second member into said second position arrangement so as to cause said fourth reflective surface and said second exit reflective surface to become optically effective to deflect the light of said second incoming light beam toward the observer.

9. A periscope switchover mirror system for enabling an observer to view a first scene in a first sight direction forward of the observer and a second scene in a second sight direction rearward of the observer, the periscope switchover mirror system comprising:

a housing;

a plurality of optical members mounted in said housing so as to be in spaced relationship to each other;

a plurality of reflective surfaces disposed on said members;

actuating means for pivotally moving a first one of said members out of a first position arrangement wherein an even number of said reflective surfaces define a first viewing beam path to enable the observer to view said first scene and into a second position arrangement wherein an odd number of said reflective surfaces define a second viewing beam path to enable the observer to view said second scene;

said housing having an upper end and a lower end; a first one of said members being pivotally mounted in said housing at said upper end;

a second one of said members being mounted at said lower end;

a third one of said members being mounted at said upper end in spaced relationship to said first member;

a first one of said reflective surfaces being disposed on a first side of said first member as a first entrance mirror surface and said first member being pivotally disposed in said first position arrangement so as to cause said first entrance mirror surface to be at a first angle to said first sight direction;

a second one of said reflective surfaces being disposed on a second side of said first member as a second entrance mirror surface;

a third one of said reflective surfaces being disposed on said second member as an exit mirror surface and said second member being disposed in said housing so as to cause said exit mirror surface to be parallel to said first entrance mirror surface for receiving the light travelling along said first viewing beam path and deflecting this light toward the observer;

a fourth one of said reflective surfaces being disposed on said third member as a third entrance mirror surface; and, said actuating means including eccentric pivot means for pivoting said first member through a second angle about a pivot axis eccentric to said first member to bring said first member into said second position arrangement so as to cause said second entrance mirror surface to deflect the light from said second scene into said third entrance mirror surface, which in turn, deflects this light downwardly to said exit mirror surface at a third angle with respect to said second sight direction.

10. The periscope switchover mirror system of claim 9, said first, second and third angles being 45°, 22.5° and 90°, respectively.

11. The periscope switchover mirror system of claim 9, said housing being a hollow shaft and said members being mounted in said shaft; and, said shaft including: a forward entrance window for receiving light from said first scene; a rearward entrance window for receiving light from said second scene; and, an exit window for passing said light to the observer.

12. The periscope switchover mirror system of claim 11, said first and third members being arranged at the upper end of said shaft adjacent said entrance windows and said second member being arranged at the lower end of said shaft adjacent said exit window; said shaft having a mid region between said ends; and, said system further comprising a first medium disposed in said shaft at said mid region so as to be disposed between said first and third members on the one hand, and said second member on the other hand; a second medium disposed in the remainder of said shaft; and, said first medium having an optical density greater than said second medium.

13. The periscope switchover mirror system of claim 12, said second medium being air.

14. The periscope switchover mirror system of claim 9, said housing having an inner wall and said second member being mounted on said inner wall.

15. A periscope switchover mirror system for enabling an observer to view a first scene in a first sight direction forward of the observer and a second scene in a second sight direction rearward of the observer, the periscope switchover mirror system comprising:

a housing;

a plurality of optical members mounted in said housing so as to be in spaced relationship to each other;

a plurality of reflective surfaces disposed on said members;

actuating means for pivotally moving a first one of said members out of a first position arrangement wherein an even number of said reflective surfaces define a first viewing beam path to enable the observer to view said first scene and into a second position arrangement wherein an odd number of said reflective surfaces define a second viewing beam path to enable the observer to view said second scene;

said housing having an upper end and a lower end; a first one of said members being pivotally mounted in said housing at said upper end;

a second one of said members being mounted at said lower end;

a third one of said members being mounted at said upper end in spaced relationship to said first member;

a first one of said reflective surfaces being disposed on a first side of said first member as a first entrance mirror surface and said first member being pivotally disposed in said first position arrangement so as to cause said first entrance mirror surface to be at a first angle to said first sight direction;

a second one of said reflective surfaces being disposed on said second member as an exit mirror surface and said second member being disposed in said housing so as to cause said exit mirror surface to be parallel to said first entrance mirror surface for receiving the light travelling along said first viewing beam path and deflecting this light toward the observer;

a third one of said reflective surfaces being disposed on said third member as a second entrance mirror surface; and, said actuating means including eccentric pivot means for pivoting said first member through a second angle about a pivot axis eccentric to said first member to bring said first member into said second position arrangement so as to cause said first entrance mirror surface to deflect the light from said second scene into said second entrance mirror surface, which in turn, deflects this light downwardly to said exit mirror surface at a third angle with respect to said second sight direction.

16. The periscope switchover mirror system of claim 15, said first, second and third angles being 45°, 202.5° and 90°, respectively.

17. The periscope switchover mirror system of claim 15, said housing being a hollow shaft and said members being mounted said shaft; and, said shaft including: a forward entrance window for receiving light from said first scene; a rearward entrance window for receiving light from said second scene; and, an exit window for passing said light to the observer.

18. The periscope switchover mirror system of claim 17, said first and third members being arranged at the upper end of said shaft adjacent said entrance windows and said second member being arranged at the lower end of said shaft adjacent said exit window; said shaft having a mid region between said ends; and, said system further comprising a first medium disposed in said shaft at said mid region so as to be disposed between said first and third members on the one hand, and said second member on the other hand; a second medium disposed in the remainder of said shaft; and, said first medium having an optical density greater than said second medium.

19. The periscope switchover mirror system of claim 18, said second medium being air.

20. The periscope switchover mirror system of claim 15, said housing having an inner wall and said second member being mounted on said inner wall.

21. A periscope switchover mirror system for enabling an observer to view a first scene in a first sight direction forward of the observer and a second scene in a second sight direction rearward of the observer, the periscope switchover mirror system comprising:

a housing;

a plurality of optical members mounted in said housing so as to be in spaced relationship to each other;

a plurality of reflective surfaces disposed on said members;

actuating means for pivotally moving a first one of said members out of a first position arrangement wherein an even number of said reflective surfaces define a first viewing beam path to enable the observer to view said first scene and into a second position arrangement wherein an odd number of said reflective surfaces define a second viewing beam path to enable the observer to view said second scene;

said housing having an upper end and a lower end; a first one of said members being pivotally mounted in said housing at said upper end;

a second one of said members being mounted at said lower end;

a third one of said members being mounted at said upper end in spaced relationship to said first member;

a first one of said reflective surfaces being disposed on said first member as a first entrance mirror surface and said first member being pivotally disposed in said first position arrangement so as to cause said first entrance mirror surface to be at a first angle to said first sight direction;

a second one of said reflective surfaces being disposed on said second member as an exit mirror surface and said second member being disposed in said housing so as to cause said exit mirror surface to be parallel to said first entrance mirror surface for receiving the light travelling along said first viewing beam path and deflecting this light toward the observer;

a third one of said reflective surfaces being disposed on said third member as a second entrance mirror surface for receiving the light from said second scene; and, said actuating means including eccentric pivot means for eccentrically pivoting said first member through a second angle about a pivot axis eccentric to said first member to bring said first member into said second position arrangement so as to cause said first entrance mirror surface to deflect the light from said second entrance mirror surface into said exit mirror surface, which, in turn, deflects this light at a third angle to said observer.

22. The periscope switchover mirror system of claim 21, said first, second and third angles being 45°, 22.5° and 90°, respectively.

23. The periscope switchover mirror system of claim 21, said housing being a hollow shaft and said members being mounted in said shaft; and, said shaft including: a forward entrance window for receiving light from said first scene; a rearward entrance window for receiving light from said second scene; and, an exit window for passing said light to the observer.

24. The periscope switchover mirror system of claim 23, said first and third members being arranged at the upper end of said shaft adjacent said entrance windows and said second member being arranged at the lower end of said shaft adjacent said exit window; said shaft having a mid region between said ends; and, said system further comprising a first medium disposed in said shaft at said mid region so as to be disposed between said first and third members on the one hand, and said second member on the other hand; a second medium disposed in the remainder of said shaft; and, said first medium having an optical density greater than said second medium.

25. The periscope switchover mirror system of claim 24, said second medium being air.

26. The periscope switchover mirror system of claim 21, said housing having an inner wall and said second member being mounted on said inner wall.

27. A periscope switchover mirror system for enabling an observer to view a first scene in a first sight direction forward of the observer and a second scene in a second sight direction rearward of the observer, the periscope switchover mirror system comprising:
a housing;
a plurality of members mounted in said housing so as to be in spaced relationship to each other;
a plurality of reflective surface disposed on said members;
actuating means for pivotally moving a first one of said members out of a first position arrangement wherein an even number of said reflective surfaces define a first viewing beam path to enable the observer to view said first scene and into a second position arrangement wherein an odd number of said reflective surfaces define a second viewing beam path to enable the observer to view said second scene;
said housing having an upper end and a lower end;
said first member being a prism pivotally mounted in said housing at said upper end;
a second one of said members being mounted at said lower end;
a first one of said reflective surfaces being disposed on one surface of said prism as a first entrance mirror surface and said first member being pivotally disposed in said first position arrangement so as to cause said first entrance mirror surface to be a first angle to said firs sight direction;
a second one of said reflective surfaces being disposed on another surface of said prism as a second entrance mirror surface;
a third one of said reflective surfaces being disposed on still another surface of said prism as a deflecting mirror for said second viewing beam path;
a fourth one of said reflective surfaces being disposed on said second member as an exit mirror surface and said second member being mounted in said housing so as to cause said exit mirror surface to be parallel to said first entrance mirror surface for receiving the light travelling along said first viewing beam path and deflecting this light toward the observer; and,
eccentric pivot means for eccentrically pivoting said prism through a second angle about a pivot axis eccentric to said first entrance mirror surface to bring said prism into said second position arrangement so as to cause said second entrance mirror surface and said fourth mirror surface to conjointly deflect the light from said second scene to said exit mirror surface, which, in turn, deflects this light at a third angle toward the observer.

28. The periscope switchover mirror system of claim 27, said first angle being 45°, said second angle being 202.5°, and said third angle being 90°; and, said first and second entrance mirror surfaces being disposed on said prism so as to lie at 45° with respect to each other.

29. The periscope switchover mirror system of claim 27, said means for pivotally moving said first one of said members between said position arrangements being mechanical means articulately connected to said first member.

30. The periscope switchover mirror system of claim 27, said housing being a hollow shaft and said members being mounted in said shaft; and, said shaft including: a forward entrance window for receiving light from said first scene; a rearward entrance window for receiving light from said second scene; and, an exit window for passing said light to the observer.

31. The periscope switchover mirror system of claim 30, said first and third members being arranged at the upper end of said shaft adjacent said entrance windows and said second member being arranged at the lower end of said shaft adjacent said exit window; said shaft having a mid region between said ends; and, said system further comprising a first medium disposed in said shaft at said mid region so as to be disposed between said first and third members on the one hand, and said second member on the other hand; a second medium disposed in the remainder of said shaft; and, said first medium having an optical density greater than said second medium.

32. The periscope switchover mirror system of claim 31, said second medium being air.

33. The periscope switchover mirror system of claim 27, said housing having an inner wall and said second member being mounted on said inner wall.

* * * * *

UNITED STATES PATENT AND TRADEMARK OFFICE
CERTIFICATE OF CORRECTION

PATENT NO. : 5,134,519
DATED : July 28, 1992
INVENTOR(S) : Alfons Abele and Klaus Völker It is certified that error appears in the above-indentified patent and that said Letters Patent is hereby corrected as shown below:

In column 9, line 67: between "mounted" and "said", insert -- in --.

In column 11, line 44: delete "surface" and substitute -- surfaces -- therefor.

In column 12, line 2: between "be" and "a", insert -- at --.

In column 12, line 3: delete "firs" and substitute -- first -- therefor.

Signed and Sealed this

Fourteenth Day of December, 1993

Attest:

BRUCE LEHMAN

*Attesting Officer*    *Commissioner of Patents and Trademarks*